(12) United States Patent
Bock

(10) Patent No.: US 7,234,866 B2
(45) Date of Patent: Jun. 26, 2007

(54) LINEAR SLIDING GUIDE, IN PARTICULAR FOR INTER-ADJUSTABLE COMPONENTS OF OFFICE CHAIRS

(75) Inventor: Hermann Bock, Pyrbaum (DE)

(73) Assignee: Bock 1 GmbH & Co., Postbauer-Heng (DE)

( * ) Notice: Subject to any disclaimer, the term of this patent is extended or adjusted under 35 U.S.C. 154(b) by 646 days.

(21) Appl. No.: 10/684,799

(22) Filed: Oct. 15, 2003

(65) Prior Publication Data

US 2004/0136624 A1 Jul. 15, 2004

(30) Foreign Application Priority Data

Oct. 15, 2002 (DE) ................................ 102 47 959

(51) Int. Cl.
*F16C 29/02* (2006.01)
(52) U.S. Cl. ............................. 384/10; 384/21; 384/37; 384/42
(58) Field of Classification Search ................. 384/10, 384/21, 34, 37, 38, 42
See application file for complete search history.

(56) References Cited

U.S. PATENT DOCUMENTS

| | | | |
|---|---|---|---|
| 3,087,038 A | * | 4/1963 | Bethke ........................ 200/237 |
| 3,145,065 A | * | 8/1964 | Cator ........................... 384/49 |
| 3,301,611 A | | 1/1967 | Dunlap |
| 3,545,716 A | | 12/1970 | Colautti |
| 4,923,311 A | * | 5/1990 | Gibbs et al. ................... 384/49 |
| 5,268,970 A | * | 12/1993 | Tanaka ........................ 384/43 |
| 5,735,610 A | * | 4/1998 | Mark et al. ................... 384/42 |
| 6,478,466 B1 | | 11/2002 | Chang et al. |

FOREIGN PATENT DOCUMENTS

| | | | |
|---|---|---|---|
| DE | 355339 | | 6/1922 |
| DE | 5 11 985 | | 11/1930 |
| DE | 807753 | | 7/1951 |
| DE | 8 26 384 | | 1/1952 |
| DE | 6915893 | | 4/1969 |
| DE | 2338686 | | 7/1973 |
| DE | 2741057 | | 3/1979 |
| DE | 35 24 401 | * | 1/1987 |
| DE | 19734980 A1 | | 2/1999 |

\* cited by examiner

*Primary Examiner*—William C. Joyce
(74) *Attorney, Agent, or Firm*—Browdy and Neimark, PLLC

(57) ABSTRACT

A linear sliding guide comprises a longitudinal guide rail with guide flanks that extend in a direction of sliding and a bearing block that lodges therein and has corresponding counterpart flanks. Compensation-for-play spring assemblies are provided between these two components; they are formed by a receptacle and a spring bushing that is inserted therein. The spring bushing acts on the corresponding guide flank of the longitudinal guide rail by way of a gap in the receptacle.

17 Claims, 3 Drawing Sheets

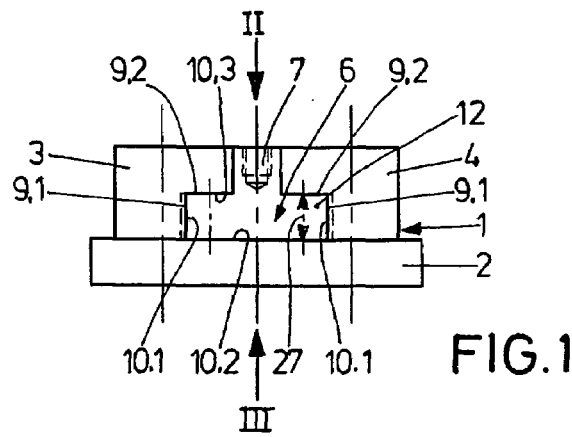
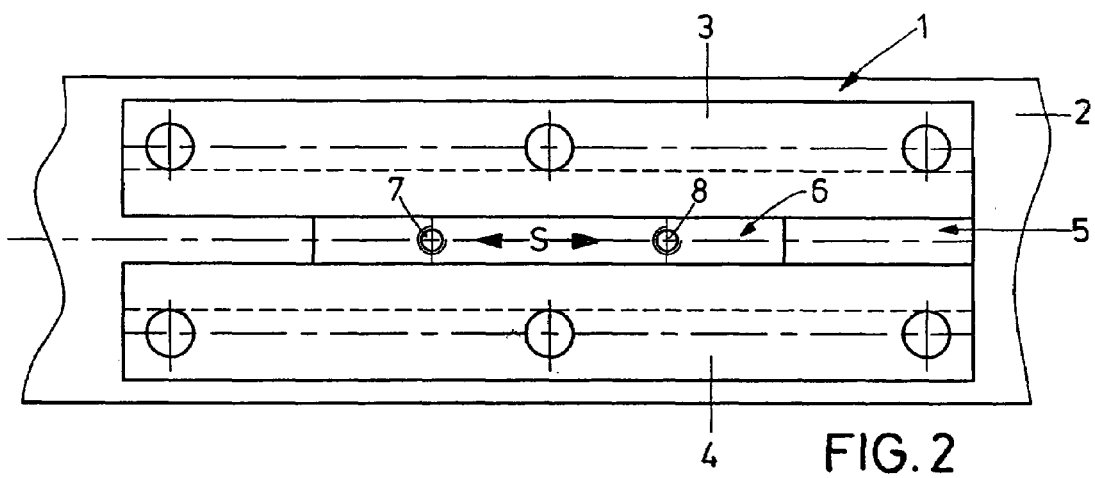
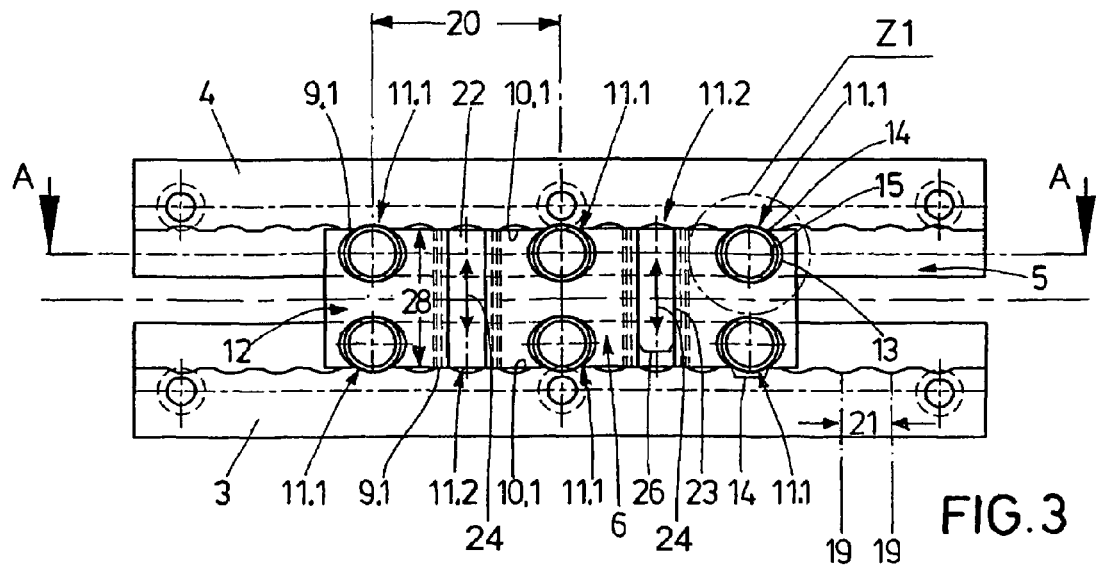

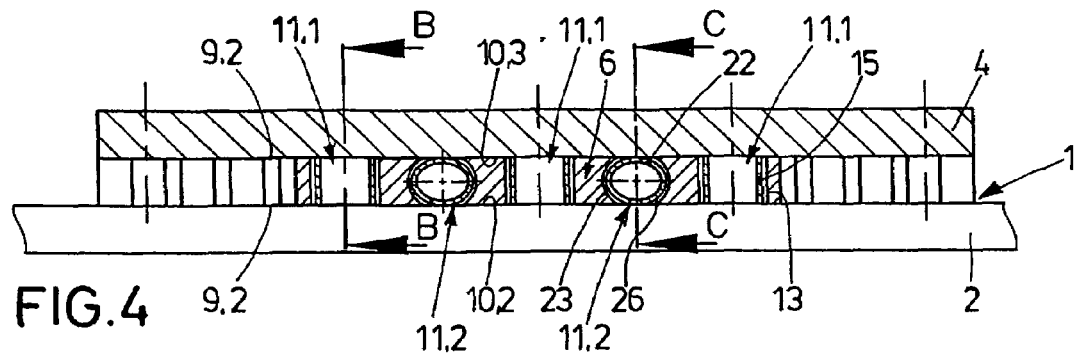
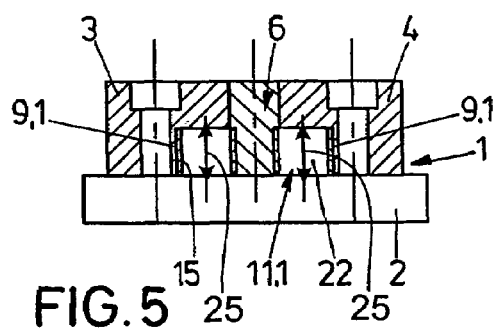
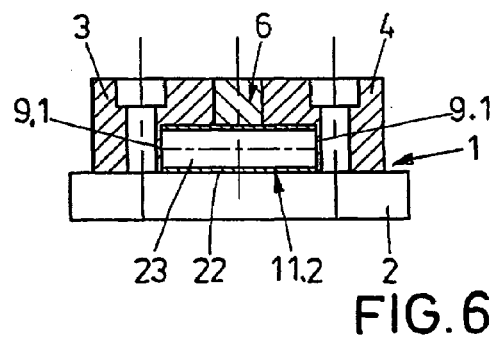
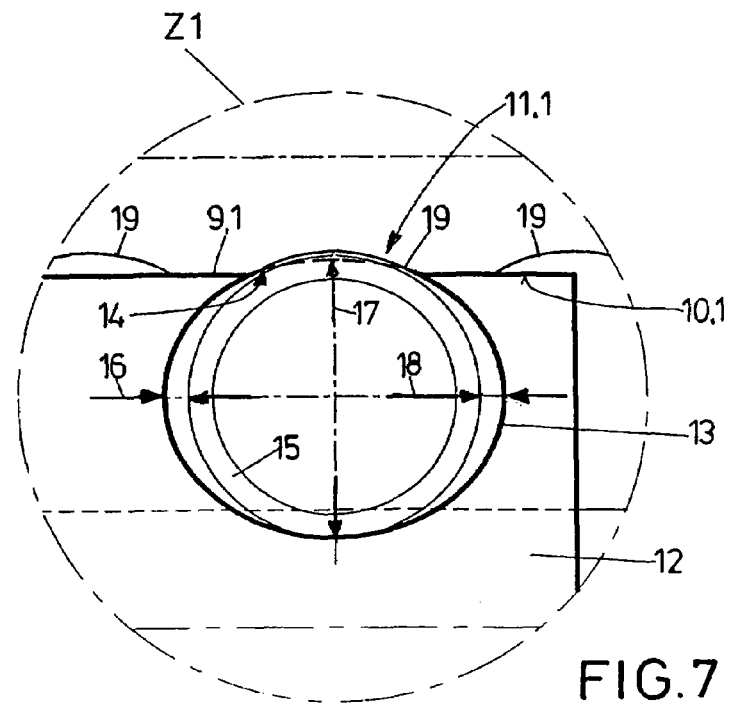

LINEAR SLIDING GUIDE, IN PARTICULAR FOR INTER-ADJUSTABLE COMPONENTS OF OFFICE CHAIRS

BACKGROUND OF THE INVENTION

1. Field of the Invention

The invention relates to a linear sliding guide, in particular for inter-adjustable components of office chairs, comprising a longitudinal guide rail with guide flanks which extend in a direction of sliding; a bearing block which lodges in the longitudinal guide rail and has counterpart flanks that are parallel to the guide flanks, with the longitudinal guide rail and the bearing block being inter-adjustable in the direction of sliding; at least one compensation-for-play spring assembly between the longitudinal guide rail and the bearing block, the spring assembly being comprised of a substantially cylindrical receptacle, which lodges in the longitudinal guide rail or in the bearing block, and which is disposed in a marginal area of the longitudinal guide rail or bearing block with its cylinder axis being parallel to the respective flank, and the clear cross section of which is laterally open by a gap towards the respective flank; and an elastically deformable spring bushing which is inserted axially parallel in the receptacle such that it acts via the gap on the opposite flank of the bearing block or longitudinal guide rail.

2. Background Art

As regards the background of the invention, modern office chairs are equipped with multiple possibilities of adjustment of, for example, backrest height, seat depth, armrest height, lengthwise armrest position etc. The linear sliding guides used therefor have a longitudinal guide rail with guide flanks that run in the direction of sliding, with a skid-type bearing block for the to-be-adjusted part being displaceably guided in the guide rail. The bearing block is provided with counterpart flanks that run parallel to the guide flanks of the longitudinal guide rail.

A problem of these linear guides resides in that on the one hand the longitudinal guide rail and the bearing block that runs thereon must have a certain play for smooth sliding to be possible. On the other hand, this play leads to a degree of freedom within the sliding guide, which may result in the sliding part wobbling. This does not only lead to increased wear of the sliding parts, but is felt to be of inferior quality by users of these office chairs. Adjustable parts are supposed to fit properly and stably while a chair is used and to run smoothly with close fit when sliding.

So as to get rid of the above problems, prior art attempts have been made to produce a sort of compensation for play and tolerance by providing nubs in the shape of warts on the flanks of the components involved of the linear sliding guide. However, these nubs will produce point contact with the actuated flank, which may lead to rapid wear in particular upon frequent adjustment.

SUMMARY OF THE INVENTION

It is an object of the invention to further develop a linear sliding guide of the generic type in such a way that an excellent guide is obtained with little constructional requirements, which distinguishes by compensation for tolerance and resistance to wear.

This object is attained by a compensation-for-play spring assembly arranged between the longitudinal guide rail and bearing block, comprising a substantially cylindrical receptacle which is provided in the longitudinal guide rail or in the bearing block and which is disposed in the marginal area of the longitudinal guide rail or bearing block with its cylinder axis parallel to the respective flank and the clear cross-section of which is laterally open by a gap towards the respective flank. Another component of the compensation-for-play spring assembly is an elastically deformable spring bushing which is inserted in the receptacle parallel to the axis, spring-loading the opposite flank of the bearing block or longitudinal guide rail via the gap.

As a result of this construction, the components involved in the sliding guide are set virtually free from play, owing to the load of the spring bushing on the opposite flank of another component, so that any wobble of the two components is precluded. The spring bushing in particular consisting of smoothly sliding plastic material, this enables the two components to be inter-adjustable by close fit. Finally, the spring bushing also works as a compensation for tolerance, permitting attenuated deflection relative to each other of the two components involved in the sliding guide when there is a greater tolerance between them that may be intentional.

In keeping with another advantageous embodiment, the shape of the spring bushing and its bearing against the opposite flank produce line contact instead of point contact. This implies a reduction in wear as opposed to point contact.

The elasticity of the spring bushing, and thus the behaviour of the linear sliding guide in compensation for play and tolerance, can be widely controlled by the design of dimensioning, receptacle shaping and material properties of the spring bushing, for example also by the bushing being slit. The spring bushing can also be made of solid elastic material, having the shape of a roll.

Finally, mounting the compensation-for-play spring assembly solely requires the elastically deformable spring bushing to be inserted into the corresponding receptacle, where it can be mounted, self-locking by proper elasticity and inserted by radial crush, so that after equipment of a bearing block with a plurality of compensation-for-play assemblies, only the bearing block and the longitudinal guide rail need to be engaged with each other.

In keeping with a very special improvement of the linear sliding guide according to the invention, the flank that the spring bushing or bushings act/s on is provided with spring-bush locking depressions. In this way, the compensation-for-play spring assemblies, in addition to the proper purpose, take the function of locking upon inter-adjustment of the two components involved.

Preferred embodiments, details and advantages of the invention will become apparent from the sub-claims and the ensuing description of an exemplary embodiment, taken in conjunction with the drawings.

BRIEF DESCRIPTION OF THE DRAWINGS

FIG. 1 is a frontal elevation of a linear sliding guide;

FIG. 2 is a view of the linear sliding guide seen in the direction of the arrow II of FIG. 1;

FIG. 3 is a view of the linear sliding guide seen in the direction of the arrown III of FIG. 1, with the base beam removed;

FIG. 4 is a longitudinal sectional view of the linear sliding guide on the line A—A of FIG. 3;

FIGS. 5 and 6 are cross-sectional views of the linear sliding guide on the lines B—B and C—C, respectively, of FIG. 4;

FIG. 7 is a view, on an enlarged scale, of the detail Z1, seen in FIG. 3, of the linear sliding guide;

DESCRIPTION OF A PREFERRED EMBODIMENT

Figure 8:
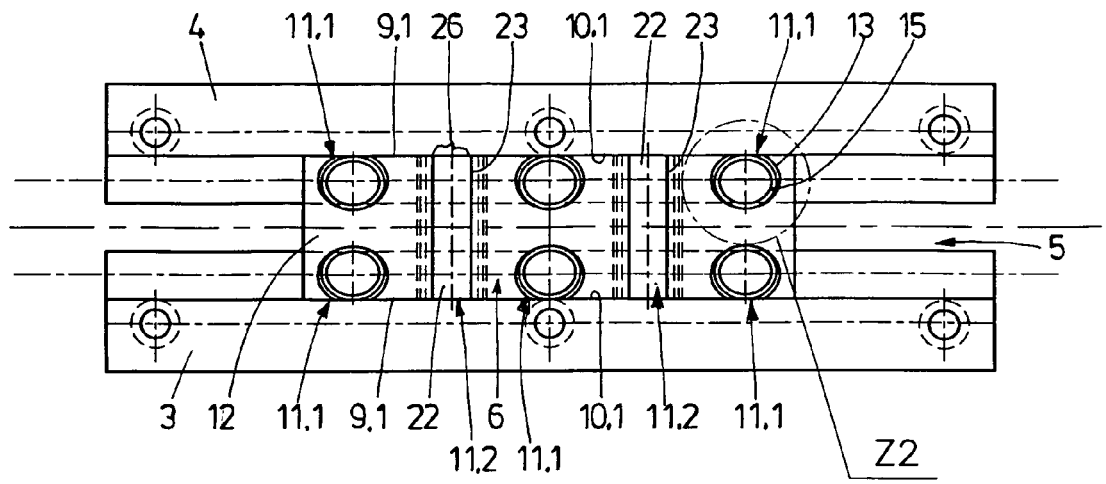
FIG. 8 is a view, by analogy to FIG. 3, of an alternative of a linear sliding guide.

As seen in FIG. 1, a linear sliding guide comprises a longitudinal guide rail 1 which consists of a base beam 2 in the form of a flat billet and two parallel angle sections 3, 4 that are screwed thereon. The sections are arranged for the base beam 2 and the angle sections 3, 4 to constitute a cross-sectionally T-shaped guide channel 5 in which a bearing block 6 of corresponding cross-sectional shape is guided for displacement in the direction of sliding S.

A linear sliding guide of this type may be provided for example on an office chair, with the base beam 2 being mounted rigidly on the chair seat carrier and the bearing block 6 being joined to a backrest carrier (not shown) by screw fitting in corresponding holes 7, 8 (FIGS. 1 and 2). Reversed kinematics to the effect that the bearing block 6 is stationary on the chair and an adjustable part is mounted on the longitudinal guide rail are feasible just as well.

Lengthwise guidance of the bearing block 6 in the longitudinal guide rail 1 takes place by way of guide flanks 9 on the longitudinal guide rail 1, which extend in the direction of sliding S, and by counterpart flanks 10 on the bearing block 6, which extend in parallel thereto. The longitudinal guide rail 1 and the bearing block 6 are dimensioned in such a way that the guide flanks 9 and the counterpart flanks 10 have a certain play one relative to the other—which the drawings are not able to illustrate explicitly—for interadjustment of the two components relative to each other to be ensured even in the light of process tolerances that will forcibly occur.

For wobble of the longitudinal guide rail 1 and the bearing block 6 relative to each other to be precluded and compensation for tolerance to be provided, so-called compensation-for-play spring assemblies 11.1 are provided on the bearing block 6, three of which at a time lining up along the lateral counterpart flanks 10.1 of the bearing block 6. Between these pairs of horizontally acting compensation-for-play spring assemblies 11.1, provision is made for in each case one compensation-for-play spring assembly 11.2 that acts vertically.

Figure 9:
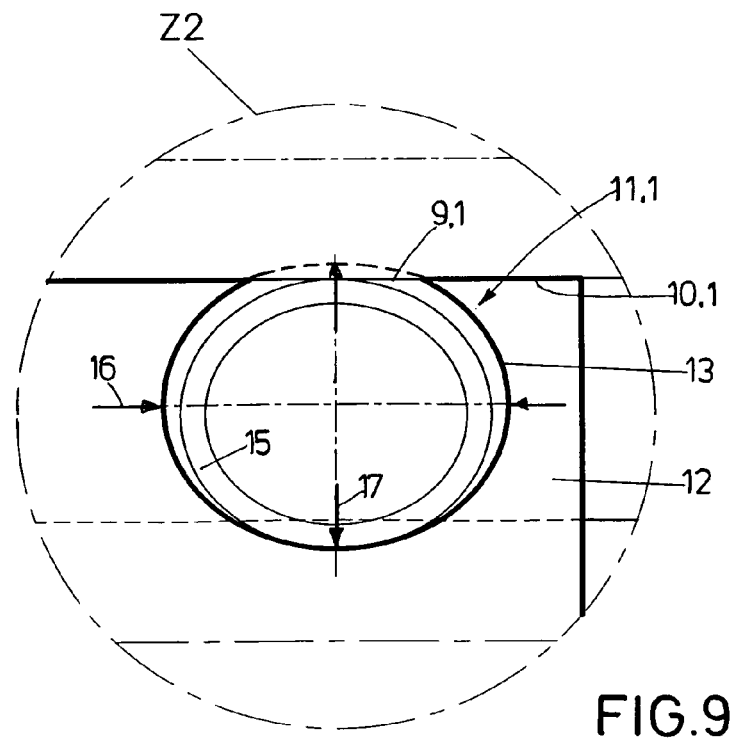
FIG. 9 is a detailed view, on an enlarged scale, of the detail Z2, seen in FIG. 8, of the linear sliding guide.

The spring assemblies 11.1 mentioned first comprise a receptacle 13 which is located in the lateral T ribs 12 and which is open at its longitudinal ends and which is substantially cylindrical, having a slightly ovalized cross-sectional shape—as seen in FIGS. 7 and 9. The receptacle 13 is located in the T ribs 12 in such a way that the contour of its jacket laterally passes beyond the counterpart flanks 10.1. In this way, the clear cross-section of the receptacles 13 is laterally open towards the respective counterpart flank 10.1 by way of a gap 14.

An elastically deformable spring bushing 15 in the form of a short piece of a pipe, for instance from PTFE, is inserted in each receptacle 13. The length thereof corresponds to the thickness 27 of the T rib 12. The outside diameter of the spring bushings 15 is such that they are inserted in the respective receptacle 13 by radial crush. Owing to the ovalization, this can for example be achieved by the long semiaxis 16 of the cross section of the receptacle exceeding, and the short semiaxis 17 of the cross section of the receptacle being less than, the outside diameter 18 of the non-deformed spring bushing 15. In this way the spring bushing 15 is retained in the receptacle 13 by part of its periphery passing through the gap 14 and acting on the opposite guide flank 9.1 of the longitudinal guide rail 1. In the embodiment according to FIGS. 1 to 7, this guide flank 9.1 is provided with a number of partially cylindrical locking depressions 19 in such a way that the spacing 20 of the receptacles 13 and spring bushings 15 corresponds to an integral multiple of the spacing 21 of the locking depressions 19. In this regard, the lengthwise positions of the longitudinal guide rail 1 and the bearing block 6 relative to each other have a regular spacing that corresponds to the spacing 21 of the locking depressions 19.

The compensation-for-play spring assemblies 11.2 are formed by spring bushings 22 that are inserted in receptacles 23. Crosswise of the direction of sliding S, the receptacles 23 run parallel to the direction of width of the T rib 12, having a direction of orientation 24 (FIG. 3) at right angles to the direction of sliding S and at right angles to the direction of orientation 25 (FIG. 5) of the receptacles 13 and spring bushings 15. In this regard, the spring assemblies 11.2 assume the job of compensation for play and tolerance in the vertical direction. The receptacles 23 and spring bushings 22 have a length that corresponds to the width 28 of the T rib. The receptacles 13 themselves are substantially cylindrical; they have a slightly ovalized cross-sectional shape and are designed for the contour of their jacket to reach beyond the corresponding counterpart flank 10.2 towards the base beam 2 and beyond the counterpart flank 10.3 towards the guide flank 9.2, facing the base beam 2, of the angle sections 3, 4. Again gaps 26 are formed on both sides of the T rib 12, which the spring bushing 22 passes through, projecting from the receptacle 23 and acting on the corresponding guide flanks 9.2 and 9.3 of the longitudinal guide rail 1. These guide flanks are not provided with locking depressions.

As compared to the first embodiment, the locking depressions 19 in the guide flanks 9.1 of the longitudinal guide rail 1 have been dropped in the embodiment of the linear sliding guide seen in FIGS. 8 and 9. As seen in FIG. 9, the spring bushing 15 is then deformed more strongly in the direction of the long semiaxis 16 of the receptacle 13 and compressed in the direction of the short semiaxis 17. Otherwise, the spring bushings 15 act on the guide flanks 9.1 of the longitudinal guide rail 1 crosswise of the direction of sliding S, upon displacement sliding with close fit along these guide flanks 9.1. This will preclude any uncontrolled wobble during smooth displacement.

What is claimed is:

1. A linear sliding guide, comprising
    a longitudinal guide rail (1) with guide flanks (9) which extend in a direction of sliding (S);
    a bearing block (6) which lodges in the longitudinal guide rail (1) and has counterpart flanks (10) that are parallel to the guide flanks (9), with the longitudinal guide rail (1) and the bearing block (6) being inter-adjustable in the direction of sliding (S);
    at least one compensation-for-play spring assembly (11) between the longitudinal guide rail (1) and the bearing block (6), the spring assembly (11) being comprised of
        a substantially cylindrical receptacle (16, 23),
            which lodges in the longitudinal guide rail (1) or in the bearing block (6),
            which is disposed in a marginal area of the longitudinal guide rail (1) or bearing block (6) with its cylinder axis being parallel to a respective flank (10), and
            a clear cross section of which is laterally open by a gap (14, 26) towards the respective flank (10); and
        an elastically deformable spring bushing (15, 22) which is inserted axially parallel in the receptacle (13, 23) such that it acts via the gap (14, 26) on an opposite flank (9) of the bearing block (6) or longitudinal guide rail (1).

2. A linear sliding guide according to claim 1, wherein the receptacle (13, 23) is slight oval in cross-sectional shape, with a long semiaxis (16) exceeding, and a short semiaxis (17) being less than, an outside diameter (18) of the spring bushing (15, 22).

3. A linear sliding guide according to claim 1, wherein the spring bushing (15, 22) is inserted by radial crush in the receptacle (13, 23).

4. A linear sliding guide according to claim 1, wherein the receptacle (13, 23) is disposed in a rib (12) of the bearing block (6) and is open towards both of its longitudinal ends.

5. A linear sliding guide according to claim 4, wherein a thickness (27) and width (28), respectively, of the rib (12) corresponds to a length of the spring bushing (15 and 22, respectively).

6. A linear sliding guide according to claim 1, wherein the flank (9), actuated by the spring bushing (15), of the longitudinal sliding rail (1) or bearing block (6) is provided with at least one locking depression (19) for the spring bushing (15) to engage with.

7. A linear sliding guide according to claim 1, wherein the spring bushing is a spring roll of elastic solid material.

8. A office chair with two linearly inter-adjustable components, wherein a linear sliding guide according to claim 1 is provided between two components.

9. A linear sliding guide comprising
a longitudinal guide rail (1) with guide flanks (9) which extend in a direction of sliding (S);
a bearing block (6) which lodges in the longitudinal guide rail (1) and has counterpart flanks (10) that are parallel to the guide flanks (9), with the longitudinal guide rail (1) and the bearing block (6) being inter-adjustable in the direction of sliding (S);
at least one compensation-for-play spring assembly (11) between the longitudinal guide rail (1) and the bearing block (6), the spring assembly (11) being comprised of
a substantially cylindrical receptacle (16, 23),
which lodges in the longitudinal guide rail (1) or in the bearing block (6),
which is disposed in a marginal area of the longitudinal guide rail (1) or bearing block (6) with its cylinder axis being parallel to a respective flank (10), and
a clear cross section of which is laterally open by a gap (14, 26) towards the respective flank (10); and
an elastically deformable spring bushing (15, 22) which is inserted axially parallel in the receptacle (13, 23) such that it acts via the gap (14, 26) on an opposite flank (9) of the bearing block (6) or longitudinal guide rail (1), wherein the receptacle (23), by its clear cross section, is laterally open by two opposite gaps (26) towards flanks (10.2, 10.3), turned away from each other, of the bearing block (6), with the spring bushing (22) acting on two respective guide flanks (10.2, 10.3) of the longitudinal guide rail (1).

10. A linear sliding guide comprising
a longitudinal guide rail (1) with guide flanks (9) which extend in a direction of sliding (S);
a bearing block (6) which lodges in the longitudinal guide rail (1) and has counterpart flanks (10) that are parallel to the guide flanks (9), with the longitudinal guide rail (1) and the bearing block (6) being inter-adjustable in the direction of sliding (S);
at least one compensation-for-play spring assembly (11) between the longitudinal guide rail (1) and the bearing block (6), the spring assembly (11) being comprised of
a substantially cylindrical receptacle (16, 23),
which lodges in the longitudinal guide rail (1) or in the bearing block (6),
which is disposed in a marginal area of the longitudinal guide rail (1) or bearing block (6) with its cylinder axis being parallel to a respective flank (10), and
a clear cross section of which is laterally open by a gap (14, 26) towards the respective flank (10); and
an elastically deformable spring bushing (15, 22) which is inserted axially parallel in the receptacle (13, 23) such that it acts via the gap (14, 26) on an opposite flank (9) of the bearing block (6) or longitudinal guide rail (1), wherein a multiplicity of receptacles (13, 23) and spring bushings (15, 22) that are inserted therein are disposed on the bearing block (6) with their respective longitudinal axes at right angles to the direction of sliding (S) and in two different directions of orientation (24, 25) that are perpendicular to each other.

11. A linear sliding guide according to claim 10, wherein the receptacle (13, 23) is slight oval in cross-sectional shape, with a long semiaxis (16) exceeding, and a short semiaxis (17) being less than, an outside diameter (18) of the spring bushing (15, 22).

12. A linear sliding guide according to claim 10, wherein the spring bushing (15, 22) is inserted by radial crush in the receptacle (13, 23).

13. A linear sliding guide according to claim 10, wherein the receptacle (13, 23) is disposed in a rib (12) of the bearing block (6) and is open towards both of its longitudinal ends.

14. A linear sliding guide according to claim 13, wherein a thickness (27) and width (28), respectively, of the rib (12) corresponds to a length of the spring bushing (15 and 22, respectively).

15. A linear sliding guide according to claim 10, wherein the spring bushing is a spring roll of elastic solid material.

16. A office chair with two linearly inter-adjustable components, wherein a linear sliding guide according to claim 10 is provided between two components.

17. A linear sliding guide comprising
a longitudinal guide rail (1) with guide flanks (9) which extend in a direction of sliding (S);
a bearing block (6) which lodges in the longitudinal guide rail (1) and has counterpart flanks (10) that are parallel to the guide flanks (9), with the longitudinal guide rail (1) and the bearing block (6) being inter-adjustable in the direction of sliding (S);
at least one compensation-for-play spring assembly (11) between the longitudinal guide rail (1) and the bearing block (6), the spring assembly (11) being comprised of
a substantially cylindrical receptacle (16, 23),
which lodges in the longitudinal guide rail (1) or in the bearing block (6),
which is disposed in a marginal area of the longitudinal guide rail (1) or bearing block (6) with its cylinder axis being parallel to a respective flank (10), and
a clear cross section of which is laterally open by a gap (14, 26) towards the respective flank (10); and
an elastically deformable spring bushing (15, 22) which is inserted axially parallel in the receptacle (13, 23) such that it acts via the gap (14, 26) on an opposite flank (9) of the bearing block (6) or longitudinal guide rail (1), wherein the flank (9), actuated by the spring bushing (15), of the longitudinal sliding rail (1) or bearing block (6) is provided with at least one locking depression (19) for the spring bushing (15) to engage with and wherein a multiplicity of locking depressions (19) is provided at a preferably regular spacing (21).

* * * * *